US012167947B2

(12) United States Patent
Racine

(10) Patent No.: US 12,167,947 B2
(45) Date of Patent: Dec. 17, 2024

(54) SUCTION HOOD FOR DENTAL PROPHY ANGLE

(71) Applicant: Kim L. Racine, Marquette, MI (US)

(72) Inventor: Kim L. Racine, Marquette, MI (US)

( * ) Notice: Subject to any disclaimer, the term of this patent is extended or adjusted under 35 U.S.C. 154(b) by 0 days.

(21) Appl. No.: 16/881,800

(22) Filed: May 22, 2020

(65) Prior Publication Data

US 2020/0390532 A1     Dec. 17, 2020

Related U.S. Application Data

(60) Provisional application No. 62/861,358, filed on Jun. 14, 2019.

(51) Int. Cl.
*A61C 17/08*    (2006.01)
*A61C 17/02*    (2006.01)

(52) U.S. Cl.
CPC .......... *A61C 17/08* (2019.05); *A61C 17/0208* (2013.01)

(58) Field of Classification Search
CPC ..... A61C 17/08; A61C 17/0208; A61C 17/06; A61C 17/222; A61C 17/22; A61C 1/088; A61C 17/005; A61C 17/096; A61C 19/007; A61M 16/0418; A61M 16/0434; A61M 16/0463; A61M 16/0477; A61M 16/0479; A61M 2016/0418; A61M 2016/0479; A61B 1/00094; A61B 2017/22079
USPC .......................................................... 433/91
See application file for complete search history.

(56) References Cited

U.S. PATENT DOCUMENTS

| 1,516,933 | A | * | 11/1924 | Terranova | ................. | A61C 1/16 |
| | | | | | | 433/116 |
| 1,682,784 | A | * | 9/1928 | Gythfeldt | ............... | A61C 1/052 |
| | | | | | | 433/116 |
| 2,436,040 | A | | 2/1948 | Friedman | | |
| 2,731,722 | A | * | 1/1956 | Wilen | ....................... | A61C 1/16 |
| | | | | | | 433/116 |

(Continued)

FOREIGN PATENT DOCUMENTS

DE           847051 C  *  8/1952
WO  WO-2009117650 A1 *  9/2009   ........... A61C 17/005

(Continued)

OTHER PUBLICATIONS

The Betty Mills Company, Trademark Corporation Plak-Vac(R) Suction Toothbrush, internet advertisement (www.bettymills.com), 2018, 2 pages, The Betty Mills Company, U.S.

(Continued)

*Primary Examiner* — Heidi M Eide
*Assistant Examiner* — Holly T. To
(74) *Attorney, Agent, or Firm* — DEVICE PATENT LLC

(57) ABSTRACT

A suction device for use with a dental prophy angle, the suction device comprising a generally horizontal, tubular, open-bottomed hood and a generally vertical suction channel. The hood is configured to cover an upper circumferential portion of the prophy angle head and optionally an upper circumferential portion of the prophy angle's working tip (such as a soft rotary cleaning cup) to define an upper suction region above the head and tip, while leaving a lower circumferential portion of the prophy angle head and full circumferential portion of at least an outer end of the tip exposed. The suction device may be a removable or a permanent part of the prophy angle.

14 Claims, 5 Drawing Sheets

(56) References Cited

U.S. PATENT DOCUMENTS

| | | | | |
|---|---|---|---|---|
| 2,862,498 | A | * | 12/1958 | Weekes ............. A61M 16/0463 128/207.14 |
| 3,512,258 | A | * | 5/1970 | Johnson ................. A61C 1/052 433/91 |
| 3,590,232 | A | * | 6/1971 | Sadowski ............ G02B 6/0005 433/29 |
| 3,890,712 | A | | 6/1975 | Lopez |
| 4,061,146 | A | * | 12/1977 | Baehr ................. A61F 9/00763 606/107 |
| 4,266,935 | A | * | 5/1981 | Hoppe ..................... A61C 1/16 433/116 |
| 4,424,036 | A | * | 1/1984 | Lokken ................ A61C 17/005 433/116 |
| 4,752,223 | A | * | 6/1988 | Carlson .................... A61C 1/16 433/116 |
| 5,122,153 | A | * | 6/1992 | Harrel .................... A61C 17/08 433/91 |
| 5,232,362 | A | * | 8/1993 | Kanas .................... A61C 17/08 433/91 |
| 5,356,292 | A | * | 10/1994 | Ho ......................... A61C 3/025 433/116 |
| 5,378,150 | A | | 1/1995 | Harrel |
| 5,531,722 | A | * | 7/1996 | Van Hale ............... A61C 1/052 433/116 |
| 5,547,375 | A | | 8/1996 | Schneider |
| 5,547,376 | A | | 8/1996 | Harrel |
| 5,554,026 | A | * | 9/1996 | Van Hale ........... A61C 17/0208 433/91 |
| 5,688,121 | A | | 11/1997 | Davis |
| 5,720,275 | A | * | 2/1998 | Patil ................. A61M 16/0418 128/207.14 |
| 5,743,736 | A | | 4/1998 | Folko et al. |
| 5,842,863 | A | * | 12/1998 | Bruns ..................... A61C 1/16 433/116 |
| 5,913,859 | A | * | 6/1999 | Shapira .............. A61B 17/1635 606/180 |
| 5,951,285 | A | * | 9/1999 | Ho ......................... A61C 3/025 604/35 |
| 6,585,512 | B2 | | 7/2003 | Van Hale |
| 6,610,059 | B1 | * | 8/2003 | West, Jr. ............. A61B 18/148 606/41 |
| 7,338,285 | B1 | * | 3/2008 | Balaban ............... A61C 17/005 433/125 |
| 8,123,523 | B2 | | 2/2012 | Carron et al. |
| 8,221,316 | B2 | * | 7/2012 | DeGould ........... A61B 17/0206 600/237 |
| 8,545,401 | B2 | * | 10/2013 | Hajarian ................. A61M 1/84 433/91 |
| 11,678,963 | B1 | * | 6/2023 | Arguello, Jr. .......... A61C 17/12 433/91 |
| 2001/0023312 | A1 | * | 9/2001 | Pacey .................... A61B 1/267 128/207.14 |
| 2003/0027100 | A1 | * | 2/2003 | Grant .................... B24C 7/0046 433/88 |
| 2003/0031979 | A1 | * | 2/2003 | Shortt .................... A61C 17/40 433/125 |
| 2003/0073054 | A1 | * | 4/2003 | Van Hale ................. A61C 1/08 433/91 |
| 2004/0106083 | A1 | * | 6/2004 | Pond ..................... A61C 1/087 433/125 |
| 2006/0246395 | A1 | * | 11/2006 | Pond .................... A61C 17/005 433/125 |
| 2006/0292522 | A1 | * | 12/2006 | Lees .................... A61C 17/005 433/116 |
| 2009/0229615 | A1 | * | 9/2009 | Stenzler ............ A61M 16/0463 128/207.14 |
| 2010/0173259 | A1 | * | 7/2010 | Vogel ..................... A61C 1/084 433/72 |
| 2010/0190129 | A1 | | 7/2010 | Paz |
| 2017/0258217 | A1 | * | 9/2017 | Zachar ............... A46B 15/0008 |
| 2018/0256301 | A1 | * | 9/2018 | McLean ............... A46D 1/0284 |
| 2019/0167382 | A1 | * | 6/2019 | Fatiny ..................... A61C 5/90 |
| 2020/0038157 | A1 | * | 2/2020 | Rassibi .................... A61C 5/90 |
| 2021/0378803 | A1 | * | 12/2021 | Stange .................... A61B 90/05 |
| 2021/0393382 | A1 | * | 12/2021 | Myers .................... A61C 17/22 |
| 2022/0079731 | A1 | * | 3/2022 | Blank .................... A61C 17/14 |
| 2022/0226088 | A1 | * | 7/2022 | Lauterbach ........ A61C 17/0202 |

FOREIGN PATENT DOCUMENTS

| | | | | |
|---|---|---|---|---|
| WO | WO-2011136798 | A1 | * 11/2011 | ............. A61C 17/02 |
| WO | WO-2018129433 | A1 | * 7/2018 | ............. A46B 11/06 |
| WO | WO-2019236968 | A1 | * 12/2019 | ............. A46B 13/02 |
| WO | WO-2022018320 | A1 | * 1/2022 | |
| WO | WO-2022020920 | A1 | * 2/2022 | |

OTHER PUBLICATIONS

Zirc, Lingua-Fix Disposable Saliva Ejector, internet advertisement (www.net32.com), 2013, 3 pages, Zirc (via www.net32.com), U.S.

Zirc Dental, Zirc Dental Pink Petal Saliva Ejector Holder, internet advertisement (www.ebay.com), 2018, 4 pages, Zirc Dental (via eBay.com), U.S.

Practicon, Practicon 7042615 Mirro-Vac Saliva Ejector Mirrors, internet advertisement (www.amazon.com), 2016, 5 pages, Practicon (via Amazon.com), U.S.

* cited by examiner

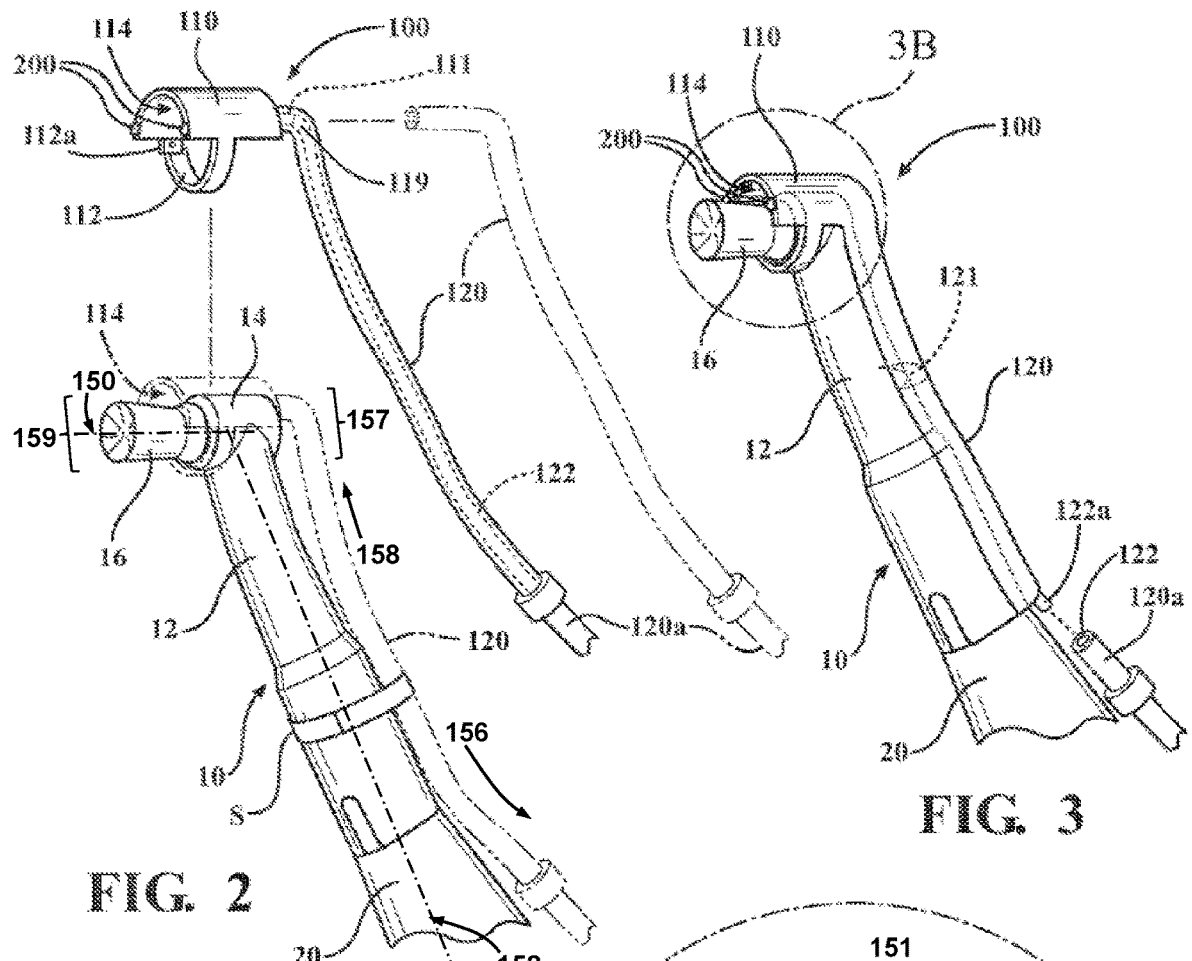
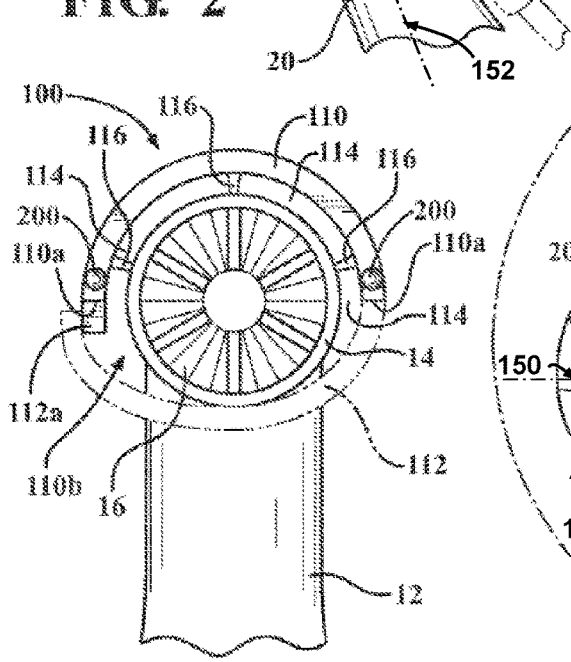
FIG. 3A
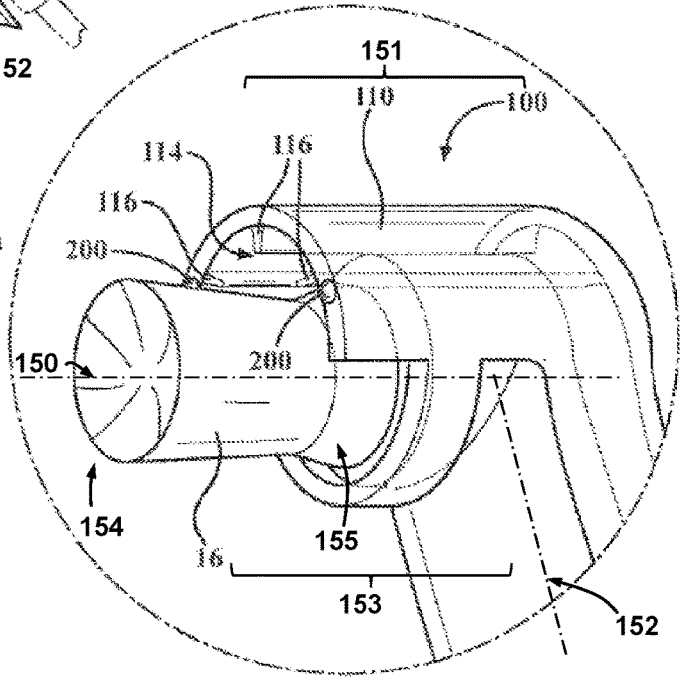
FIG. 3B

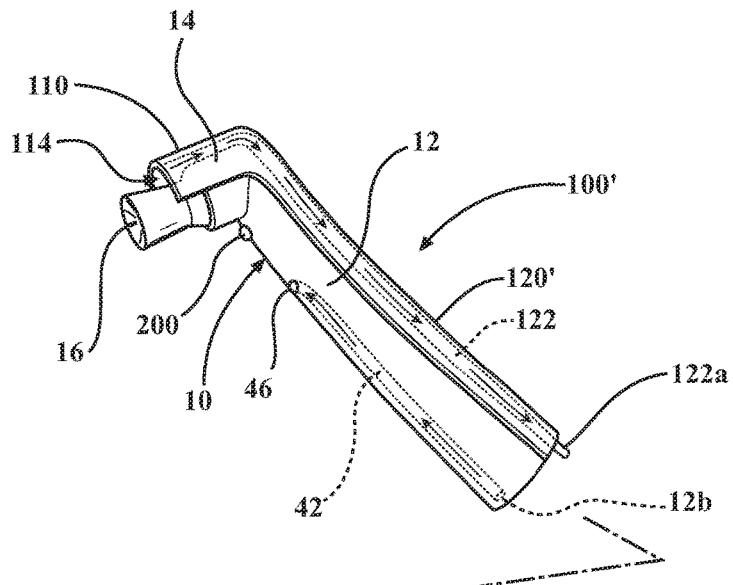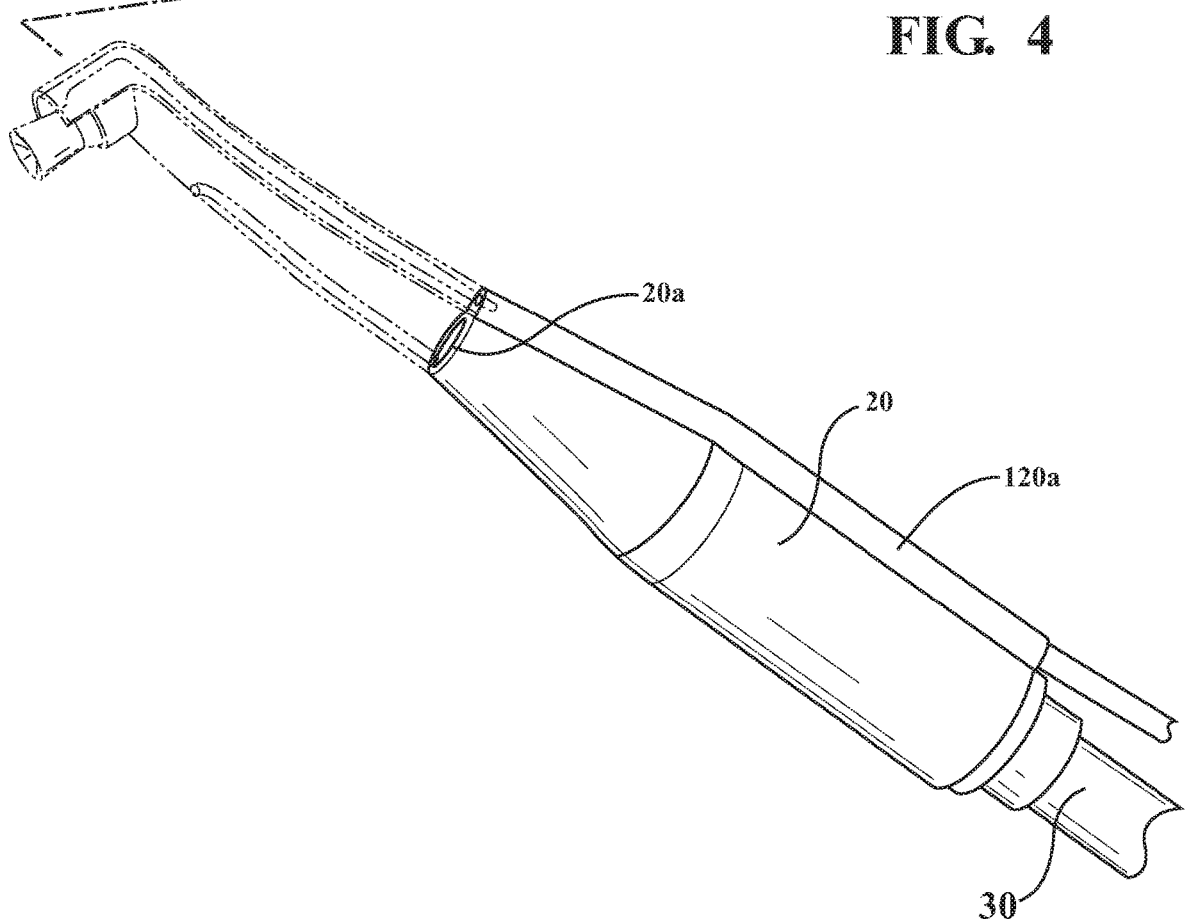
FIG. 4

SUCTION HOOD FOR DENTAL PROPHY ANGLE

RELATED APPLICATIONS/PRIORITY BENEFIT CLAIM

This application claims the benefit of U.S. Provisional Application No. 62/861,358, filed Jun. 14, 2019 by the same inventor (Racine), the entirety of which provisional application is hereby incorporated by reference.

FIELD

The subject matter of the present application is in the field of dental tools, and more specifically suction aids and shields for use with "prophy" (prophylaxis) angles.

BACKGROUND

Dental workers often use angled-head rotary cleaning devices known as prophy angles, with a generally vertical neck portion generally aligned with a hand-piece or grip and a generally horizontal head portion that is angled relative to the neck. The terms "vertical" and "horizontal" are used here in a general and relative sense to each other for convenience to describe the general shape of the tool, and not as an absolute orientation, as the orientation of the prophy angle varies in use while it is being applied to a patient's mouth. Further, the "horizontal" angle of the head portion relative to the "vertical" neck portion may vary depending on the make and model of prophy angle, and may be more or less than perpendicular to the neck portion while still being generally horizontal and vertical relative to one another.

The angled head terminates in a rotary tip which is dipped into a cleaning paste or treatment material and then applied to a patient's teeth at a variable rotational speed. The rotary tip is most commonly a relatively soft "cup" used to apply paste, but different types of rotary tip are known for different purposes, such as brushes and rubber points. Saliva, cleaning paste, rinse water, plaque, and other debris tend to be flung about in an undesirable mist or spray by the spinning tip.

To reduce this spray of debris during the cleaning process, it is common to use a suction tool known as a saliva ejector in tandem with the prophy angle. The saliva ejector is a flexible tube with a suction head that can be held by hand, or secured in the patient's mouth by shaping it into a hook, to remove debris generated by the prophy angle.

It has been proposed in the prior art to combine suction tools or suction attachments with various dental tools such as toothbrushes, prophy angles, and ultrasonic handpieces.

U.S. Pat. No. 3,512,258 to Johnson discloses a suction cleaning attachment for a dental prophylaxis angle.

U.S. Pat. No. 5,378,150 to Harrel discloses a suction hood assembly attachable to an ultrasonic handpiece.

U.S. Pat. No. 5,547,375 to Schneider discloses (FIG. 3) a suction tube device that can be clamped to an existing dental treatment unit.

U.S. Pat. No. 8,123,523 to Canon et al. discloses a dental prophy angle with a rotor conduit that may be used as part of a system to provide suction to the working area of the prophy angle.

U.S. Patent Application Pub. No. US 2006/0292522 A1 to Lees et al. discloses a disposable guard or splatter shield with a domed head that surrounds the spinning prophy cup on the end of the tool.

U.S. Patent Application Pub. No. US 2010/0190129 A1 to Paz discloses a disposable, centrally ducted suction tip combined with an ultraviolet dental lighting tool having a suction function.

The prior art as generally represented by the references above does not appear to provide a suction function combined with a prophy angle in a manner that would be truly efficient and effective for a dental worker.

BRIEF SUMMARY

The present invention is a suction device for a prophy angle, comprising a shape-holding, open-bottomed, generally horizontal tubular hood and a generally vertical suction supply tube or channel extending downwardly from a rear end of the hood. The hood is configured to cover an upper circumferential portion of the angled prophy head and preferably also an inner portion of the rotary tip. A lower circumferential portion of the angled head forward of the prophy angle neck and a full circumferential portion of at least an outer end of the rotary tip remain uncovered and visible to a dental worker. The hood is generally aligned with the angled head and spaced therefrom to define a suction intake region between the hood and the angled head along the upper circumferential portion of the angled head and any portion of the rotary tip covered by the hood. The vertical suction channel is configured to be aligned generally in parallel with a rear side of the prophy angle neck when the hood is attached to the prophy angle.

In a first form, the hood is removably attached to the angled prophy head. The suction supply tube or channel that supplies suction to the hood may be removably connected to or integrated with the removable hood.

In a second form, the hood is an integral, non-removable part of the prophy angle and the suction intake region defined by the hood is integrated with a suction supply channel extending into the base or neck of the prophy angle. Switches for independently activating suction and rinse features powered through the hand—may further be incorporated in the prophy angle. In this form, the hood and suction supply channel are preferably part of a disposable prophy angle that is removably attached to a hand-piece for one time use.

The prophy angle may be supplied with a water spray feature on an inner face of the prophy angle neck, aimed to spray a mist or jet of water at the prophy tip adjacent the suction intake path under the hood.

These and other features and advantages of the invention will become apparent from the detailed description below, in light of the accompanying drawings.

BRIEF DESCRIPTION OF THE DRAWINGS

FIG. 2 is a perspective view of the prophy angle of FIG. 1A with a removable suction device according to the invention shown attached to the prophy angle in phantom lines and exploded from the prophy angle in solid lines.

FIG. 3 is similar to FIG. 2 but shows the suction device of FIG. 2 modified for a closer fit to the prophy angle.

FIG. 3A is a front end elevation view of the head and upper neck of the prophy angle of FIG. 3 with the suction device attached.

FIG. 3B is a perspective detail view of the prophy angle head and attached suction device of FIG. 3.

FIG. 4 is a perspective view of a suction device according to the invention integrated with a detachable and disposable prophy angle.

DETAILED DESCRIPTION

Figure 1A:
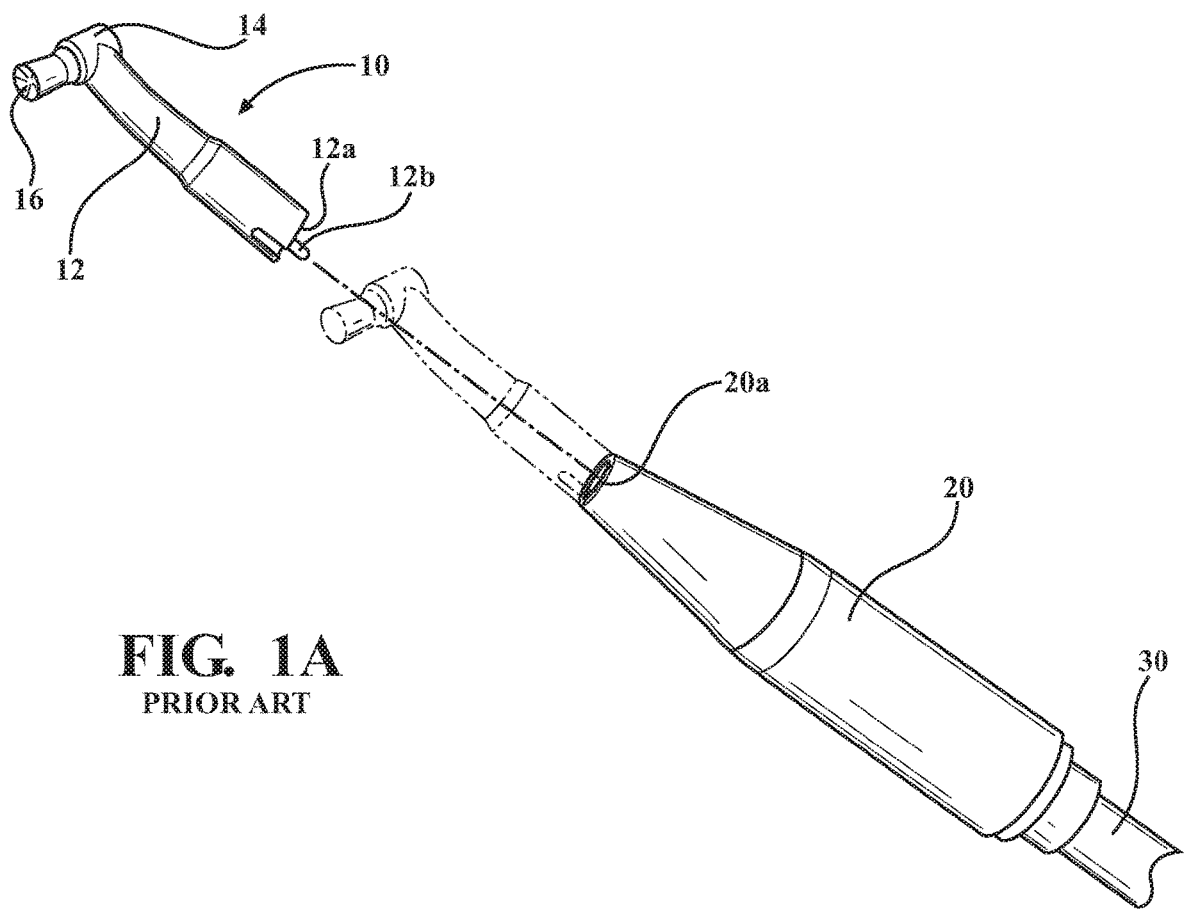
FIG. 1A is a perspective view of a prior art prophy angle tool with a removable prophy angle shown as being detachable from a grip or handle portion of the tool.
Figure 1B:
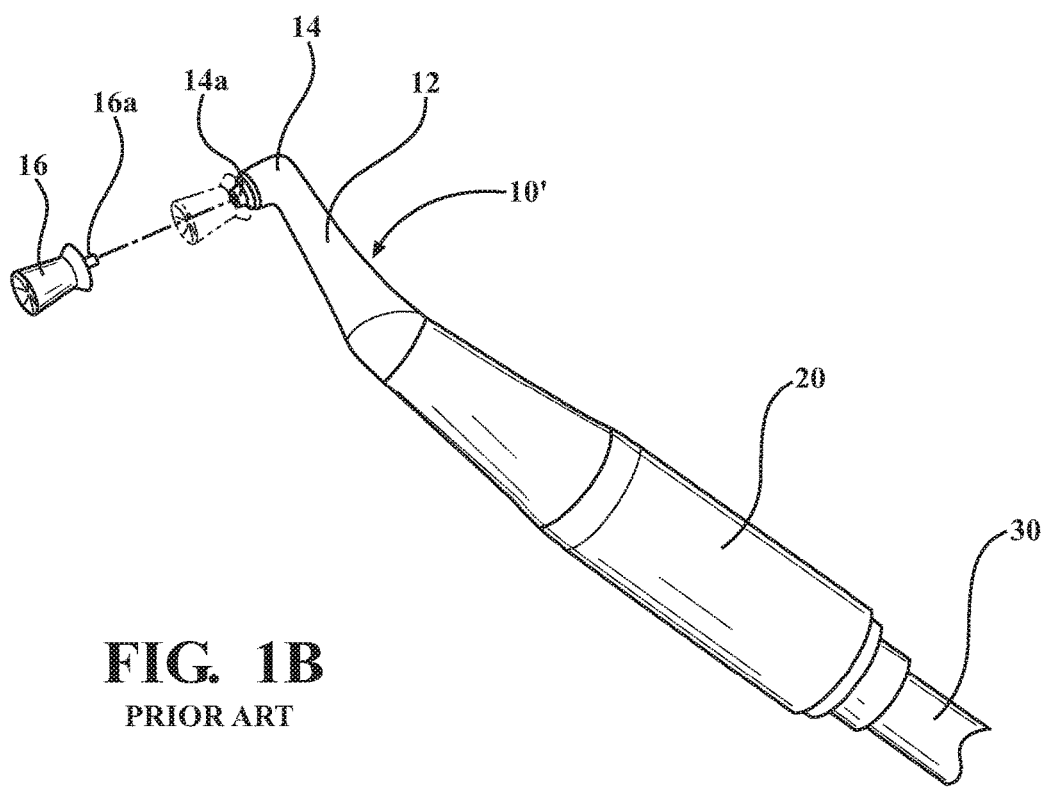
FIG. 1B is a perspective view of a prior art prophy angle tool similar to that in FIG. 1A, but where the prophy angle is integrated with the tool handle and only a disposable tip portion is normally removable.

FIGS. 1A and 1B show prior art prophy angles 10 and 10' of known type with different connections to a handpiece 20 of known type.

In FIG. 1A, prophy angle 10 is a disposable prophy angle removably attached to upper end 20a of handpiece 20. Prophy angle 10 has an elongated vertical neck 12 generally aligned with handpiece 20, and a head 14 angled generally horizontally relative to neck 12. Angled head 14 supports a rotary tip 16 of known type, in the illustrated example a cleaning or polishing cup made from a relatively soft material such as plastic or rubber to apply a cleaning paste or similar to a patient's teeth. The lower end or base 12a of neck 12 of the prophy angle includes a drive connection 12b that engages an internal drive or drive transmission (not shown, but of known type) in the upper end 20a of handpiece 20 when the prophy angle and handpiece are connected. Internal drive transmission mechanism of known type within the neck 12 and head 14 of prophy angle 10 transmits rotary drive force from handpiece 20 to rotary cup 16 to spin the cup 16 at variable speeds controlled from the handgrip, a floor pedal, or with some other type of known control.

The lower end of handpiece 20 is connected to a power-and-supply conduit 30 of known type that may contain electrical or other rotary drive power lines of known type.

In FIG. 1B the prophy angle 10' is functionally similar to prophy angle 10 in FIG. 1A, except that it is permanently integrated with handpiece 20 and only rotary tip 16 is normally removable for replacement. Rotary tip 16 has a drive connection 16a that is removably mated with a drive transmission coupling 14a in the end of head 14 to cause tip 16 to spin in known manner. The angle and/or shape of head 14 in prophy angle 10' is illustrated as different from that of head 14 in angle 10 in FIG. 1A, and those skilled in the art will recognize that the prophy angles 10 and 10' in FIGS. 1A and 1B are generally representative of many known types or styles of prophy angle, whose details may vary but whose overall shape and basic function are generally the same. While a prophy angle with a rotary tip such as cup 16 is shown by way of example, prophy angles with non-rotary dental treatment tips such as sonic cleaning tips protruding from the prophy head at a generally horizontal or right-angle to the vertical neck of the prophy angle are known and would benefit from the invention described below. Further, while a prophy head 14 usually has a rounded, generally cylindrical profile as illustrated for patient comfort, it will be apparent to those skilled in the art that other shapes for the prophy head are possible, particularly with the suction device of the invention interposed between the prophy head and the patient's mouth.

FIG. 2 shows a suction device 100 according to the invention in exemplary form in order to teach how to make and use the claimed invention. Suction device 100 in FIG. 2 is a removable device that can be attached to and removed from both removable and non-removable prophy angles, as desired. Suction device 100 includes a shape-holding, open-bottomed tubular hood 110 configured to overlie an upper circumferential portion of the prophy angle head 14 in spaced, generally parallel aligned relationship thereto, preferably with a curved tubular shape following or corresponding to the contour of the prophy angle head along its length, at least on the interior surface of the hood; the outer surface of the hood may take a different shape or profile, but a curved tubular shape generally as shown is preferred. Hood 110 extends along essentially the full length of prophy angle head 14 with a suction intake space or volume 114 maintained between the hood and the head, and further extends to partially overlie an inner portion of rotary tip 16, leaving a full circumference of at least an outer portion of rotary tip 16 exposed and leaving a partial lower circumference of at least the portion of head 14 forward of neck 12 exposed. While the portion of prophy head 14 covered or surrounded by hood 110 is described as an upper "circumference", this should be understood to include the upper perimeter of any non-circular prophy head profile. Hood 110 may be formed from various plastics known for use in dental implements that will not damage teeth and that is sufficiently rigid to hold its shape under suction applied through the hood.

Hood 110 may be removably secured in place on prophy angle head 14 in various ways, but in the illustrated embodiment a small strap portion 112 is molded with or attached to the hood 110 on one side. Strap 112 can be wrapped around the lower circumference of head 14 so that the strap's free end can be connected to an attachment point 112a on the other side of hood 110. Attachment point 112a may vary, and may be any known mechanism or structure for securing a strap, clip, or cable end, such as but not limited to a ratchet mechanism similar to a cable tie, a magnetic or mouth-safe adhesive connection, or a stud engaging one or more holes formed in strap 112. Alternately, strap 112 might be an elastic strap attached permanently at each end to the lower edges 110a (FIG. 3) of the hood 110 to fit snugly around the underside of prophy angle head 14.

The front end of hood 110 adjacent rotary tip 16 preferably overlies an inner end of the rotary tip 16, but leaves an outer end of the rotary tip 16 fully exposed about its circumference. The rear end of horizontal hood 110 opposite rotary tip 16 includes or is attached to a generally vertical suction channel 120, which may be an integral or a removable part of hood 110. In FIG. 2, the suction channel 120 is shown as a generally vertical tube configured to be aligned generally in parallel with the prophy angle neck 12, and with an angled or curved elbow portion 119 entering or connectable to the rear end of hood 110 substantially horizontally so as to be aligned with prophy angle head 14 and the longitudinal axis of hood 110. Suction tube 120 shown in solid lines in FIG. 2 is an integral, non-removable part of hood 110; suction tube 120 shown in phantom lines in FIG. 2 is a removable piece connected to a port or hollow neck 111 that may be formed at the rear of hood 110. Suction tube 120 may be connected at its lower end via a connector such as a port, nipple, or adapter 122a to any known source of suction (i.e. vacuum) commonly available in a dentist's office, such as suction tube 120a connected at a remote end to a saliva ejector base unit of known type (not shown). Suction tube 120 may be secured tightly against the vertical neck portion 12 of prophy angle 10 and against grip or base unit 20 with one or more small straps S, clips, or other fasteners. If the lower connection end of suction tube 120 or its internal channel 122 is shaped differently than the available suction supply line 120a, connector 122a may be an integral lower portion of the suction tube 120 shaped differently than the upper portion of the suction tube 120 to receive suction supply line 120a; or, connector 122a may be a removable adapter.

Vacuum applied through suction tube 120 to hood 110 creates suction in the space 114 defined between the hood 110 and the hood-enclosed upper circumferential part of prophy angle head 14, tending to draw debris generated by rotary tip 16 and the patient's mouth into the space 114 under hood 110 through the open end and bottom of the hood, and out through the rear of the hood via the suction tube 120 to a saliva ejector collection unit.

FIG. 3 shows suction device 100 with a modified suction channel 120' which enters the hood 110 vertically from underneath, in-line with the neck 12 of the prophy angle. This vertical entry helps to locate suction channel 120' closer to the prophy angle for a more comfortable, streamlined feel in the patient's mouth and for better maneuverability for the dental worker. Suction channel 120' may be formed with a half-moon cross section in which an inner face or side 121 of the channel adjacent the prophy angle neck 12 may be flat or arcuate to better fit against the rear side of the prophy angle neck.

Referring to FIGS. 2, 3, 3A and 3B, the suction space or region 114 between hood 110 and prophy angle head 14 may be maintained by spacing features such as circumferentially spaced longitudinal ribs 116 formed along the inside surface of hood 110 and extending at least over the portion of the hood 110 located over prophy angle head 14. Ribs 116 engage the upper circumference of head 14, defining unobstructed channels along the inside of the hood in region 114 for debris to flow rearwardly to the suction tube 120 whose inlet is at the rear part of the hood. Spacing features other than ribs may be used, both as part of the hood or built into the suction tube; for example, suction tube 120 may be secured to prophy angle neck 12 with a strap, clip or the like that engages the neck in a non-slip fashion to securely hold the hood 110 in spaced relationship to the prophy angle head 14. While FIGS. 3A and 3B show continuous ribs 116, the ribs may be interrupted along their length, or may comprise longitudinally spaced features other than ribs, in order to permit suction flow across as well as along their length. Also, while FIGS. 3A and 3B show the ribs 116 in the context of hood 110 of FIG. 3, it will be understood that ribs 116 are equally useful in hood 110 in the suction device of FIG. 2 since the hood portion 110 of suction device of FIG. 2 is substantially identical to that in FIG. 3.

The hood 110 is shown in FIGS. 2 through 3B as having an approximately semicircular cross-section, thereby covering the upper half of the circumference of prophy angle head 14 as a minimum. The lower sides or edges 110a of the hood may be extended farther downwardly, either in a straight or curved fashion, to cover or overlie more of the circumference of prophy angle head 14, but the bottom of hood 110 remains open at 110b, as schematically represented by the arc of strap 112 in the front end view of FIG. 3A, for approximately a quarter to a half of the lower circumferential portion of the prophy angle head 14; i.e., the hood surrounds approximately one-half to three-quarters of the circumference of the prophy head 14 (and the portion of rotary tip 16 underneath the hood). Note that FIG. 2 and FIG. 3B provide orientation labels of the device. For example, aspects such as horizontal 150, upper 151, vertical 152, lower or bottom 153, outer 154, inner 155, downward 156, rear 157, front or forward 159, and upward 158 are so labeled in the Figures and are as described earlier in the specification.

FIG. 4 shows an alternate suction device 100', similar in structure and function to device 100 above with respect to prophy angle 10, but integrated with the removable prophy angle 10, for example by molding as a single piece or by otherwise permanently attaching the hood and suction channel portions of the device to the prophy angle 10 during manufacture. Suction device 100' includes a hood portion 110 substantially the same in shape as hood 110 in FIGS. 2-3B above (but without the need for connector strap 112 or ribs 116), spaced relative to prophy head 14 to define the same suction intake region 114 around the upper circumference of prophy head 14. A suction channel portion 120' is integrally molded with hood 110 and in suction-inducing communication with the rear of hood 110. Suction channel portion 120' closely conforms to and is sealed with respect to the rear side of prophy angle neck 12. Suction channel portion 120' includes an internal suction channel 122 defined between the suction channel portion 120' and the neck 12 for connection to a suction tube 120a in a manner similar to that of device 100 in FIGS. 2-3B.

Suction channel portion 120' in FIG. 4 may be connected to a known type of suction-inducing source such as an external suction tube 120a on or associated with handpiece 20, for example via a protruding tube port 122a extending from the side or (as pictured) lower end of channel portion 120'. Alternately, the lower end of suction channel 122 could be aligned with and connected in sealed fashion to a corresponding internal suction channel formed in handpiece 20 (see FIG. 5 below) when the prophy angle 10 with its integrated suction device 100' is attached to the handpiece 20.

Figure 5:
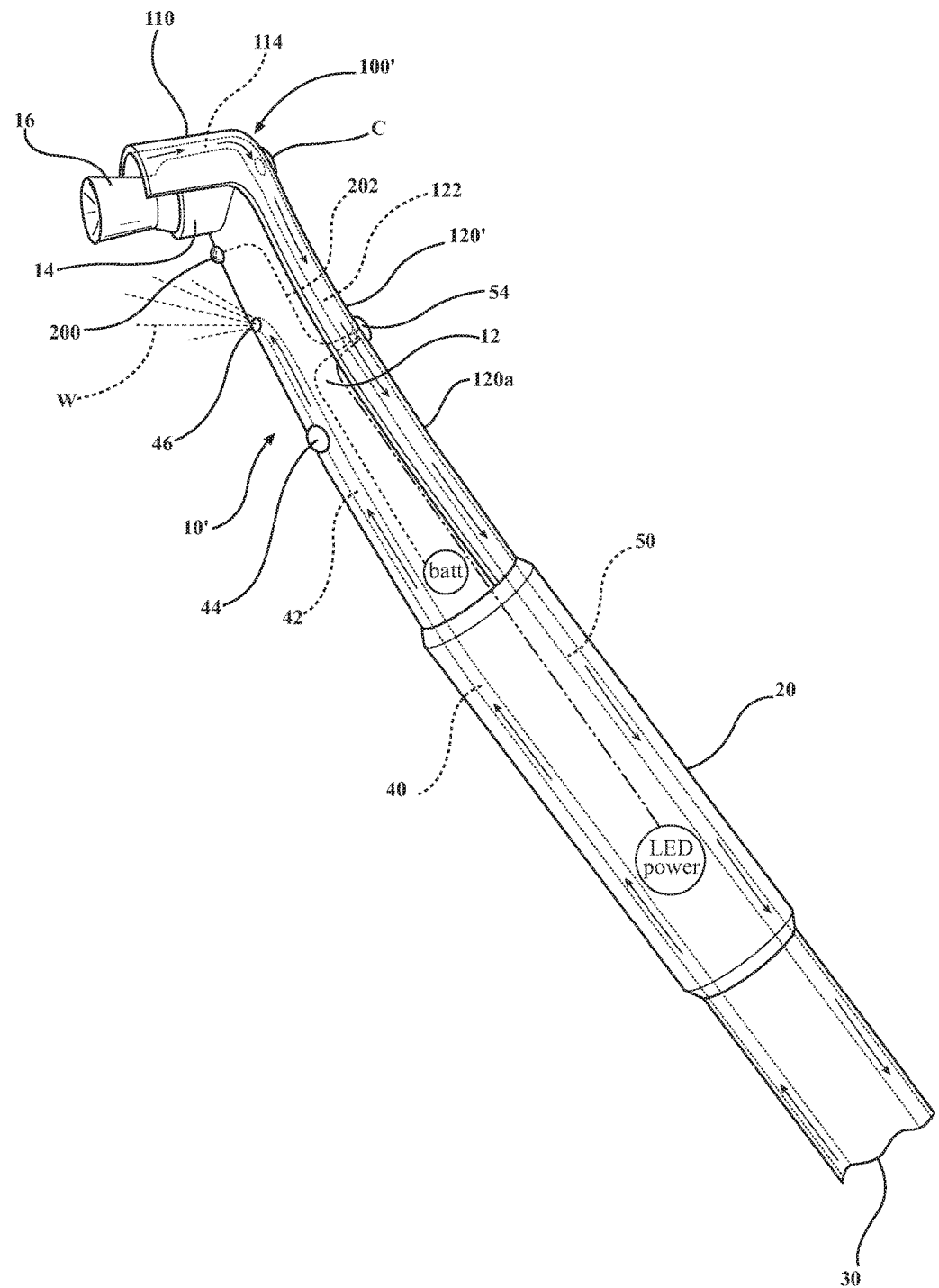
FIG. 5 is a perspective view of a prophy angle tool like that in FIG. 1B, with a non-removable prophy angle formed with the tool handpiece and with an integrated suction device according to the invention.

FIG. 5 shows a suction device 100' similar to that shown in FIG. 4, but integrated with a non-removable prophy angle 10' permanently secured to hand grip 20. Here the lower end of suction channel 122 is aligned with an internal suction supply channel 50 formed along the rear side of hand grip 20 and extending through cable or conduit 30. An on/off control 54 is schematically shown formed on the exterior of suction channel portion 120', which may control the application of suction to channel 122 via electrical signal to a remote suction supply source or by closing and opening an electrical or mechanical valve associated with channel 50 or channel 122.

The prophy angle 10' in FIG. 5 is also shown equipped with an optional water jet 46 for selectively directing a spray of water W toward the prophy head rotary tip 16. Water for jet 46 may be supplied from an external tube or an internal channel such as 42 formed in the prophy angle neck 12 and communicating with an aligned water supply passage 40 formed in the hand grip portion 20 of the tool, supplied with water in known fashion from a source in a dentist's office via supply conduit 30 and controlled with an on/off control switch or valve 44 on either the prophy angle 10' (shown schematically in FIG. 5) or on hand grip 20.

Still referring to FIGS. 4 and 5 above, the prophy angle 10' (whether removable or integrated with hand grip 20) may be a re-usable piece capable of being sterilized between uses. Similarly, hand grip 20 containing any motor, power supply or couplings, supply lines, and the like can be sterilized between uses whether the prophy angle is removable or integrated with the hand grip. To assist in cleaning and sterilization of suction device 100' when it is part of a re-usable prophy angle, an openable or removable cleanout cap C may be located at the back end of hood 110 for the manual insertion of a cleaning tool. And, as noted earlier, if the prophy angle 10' and its integrated suction device 100' is a re-usable/sterilizable unit, then the rotary tip 16 or other operative tool tip may be replaced between uses rather than sterilized and re-used, depending on the relevant dental hygiene guidelines and practices.

Figure 6:
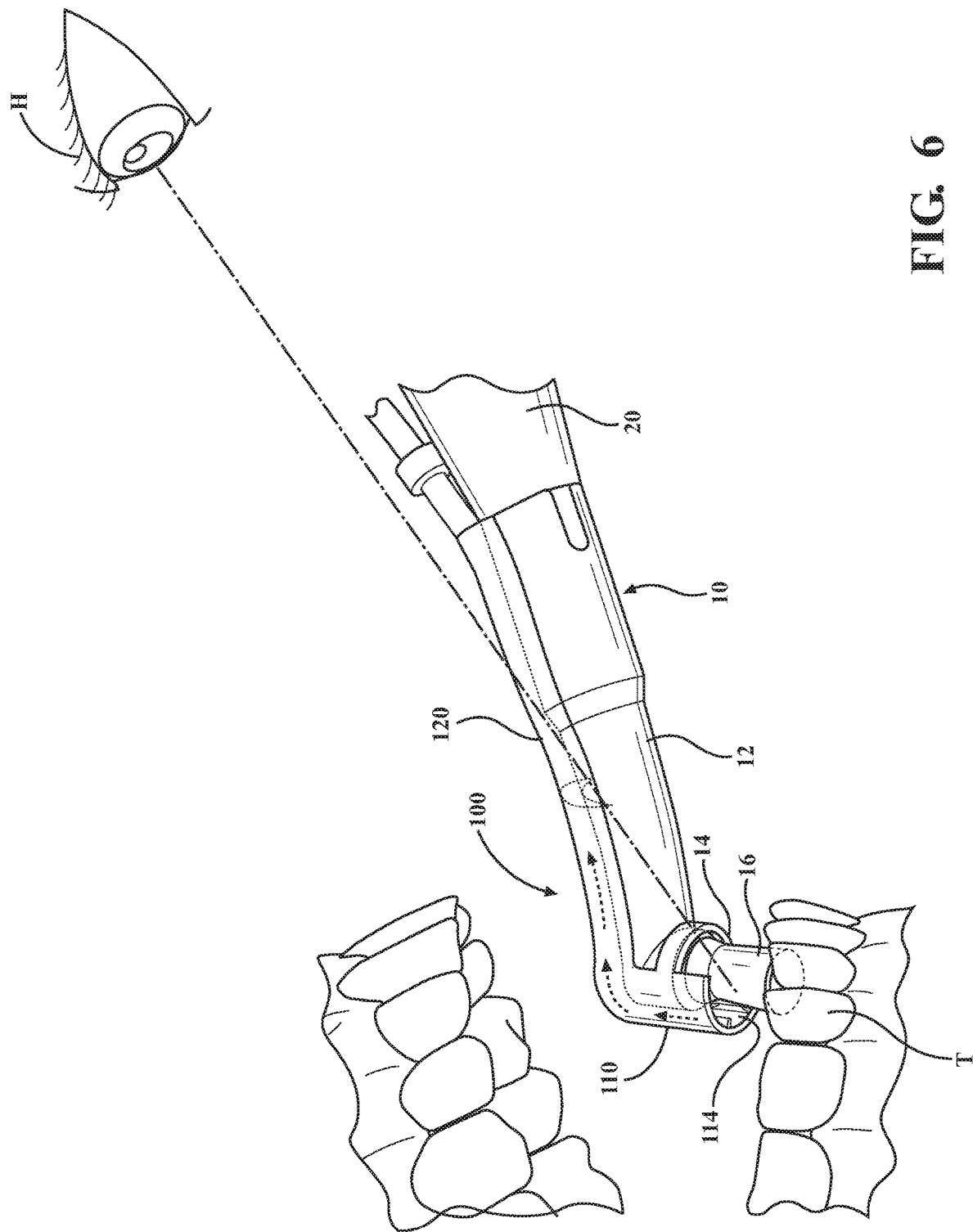
FIG. 6 is a perspective view of the prophy angle and suction device of FIG. 3 being applied to a patient's teeth.

FIG. 6 shows a suction device 100 according to the invention, in particular the example from FIG. 3, attached to the prophy angle 10 and being used to clean a patient's teeth T. As shown in FIG. 6, the partial circumferential wrap of hood 110 relative to prophy angle head 14 and rotary tip 16 allows the dental hygienist H to clearly see the engagement of the rotary tip 16 with the teeth, and to visually gauge the effectiveness of the suction removal of debris by hood 110. The amount of suction through hood 110 can accordingly be adjusted by the hygienist as needed using known controls for the suction supply source.

FIGS. 2, 3, 4, and 5 also show an LED or fiber optic lighting option useful with the suction device 100 or 100', although it may be most practical and cost effective for the prophy-integrated (non-removable) suction device 100' shown in FIGS. 4 and 5. The lighting option comprises one or more LED or similar small, remotely-powered light emitters built into the suction device and located to light the rotary tip 16 and associated cleaning area in a patient's mouth. In the removable suction device 100 of FIGS. 2 and 3, one or more light emitters 200 is mounted on the leading edge of suction hood 110 to evenly light the work area in the patient's mouth. These may be LED's powered by internal electrical supply to a battery in the suction device 100 itself, or coupled by internal electrical supply connection extending from the suction device 100 to a matching electrical connection or terminals in hand grip 20 when the suction device is connected to the hand grip, with the power source contained in or running through the hand grip. In FIG. 4, the lighting option is a light emitter 200 mounted on the prophy neck 12 facing the rotary tip 16, powered by a suitable electrical supply contained in or running through the hand grip 20 and controlled with a simple pressure switch (not shown) that may be integrated with either the suction device or the handgrip. In FIG. 5, the light emitter 200 on prophy neck 12 may be coupled at 202 to turn on when the on/off suction control switch 54 is activated; alternately, light emitter 200 could be a fiber optic light emitter/transmitter activated once a floor-mounted rheostat pedal of known type is used in known manner by the hygienist or dentist to rotate the rotary tip 16.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A suction device for attachment to a dental prophy angle comprising:
   a tubular hood;
   said tubular hood having an elongate arced profile extending along a horizontal axis between a front end at the front of the suction device and a rear end at the rear of the suction device of said tubular hood and operable to extend over the upper length of a prophy head of a prophy angle while leaving uncovered beyond the front end of the tubular hood a full circumferential portion of an outer end of the working tip of the prophy head at the front of the prophy angle;
   said tubular hood opened at the bottom operable to leave a lower portion of the prophy head uncovered;
   a strap;
   said strap radially extending from one side of said elongate arc profile to the other side around the horizontal axis and configured to circumferentially secure a prophy head of a prophy angle within the tubular hood and strap while defining a suction intake region between said tubular hood and an upper circumferential portion of the prophy head;
   said strap having a length that extends along the horizontal axis a distance that is less than the length of said tubular hood from the front end to the rear end;
   a suction tube;
   an upward end of said suction tube in communication with said rear end of said hood;
   said suction tube descending downward following a vertical axis before terminating at a downward end and configured for positioning adjacent the rear side of a prophy angle neck; and,
   wherein said downward end of said suction tube is operable for connection to a suction supply.

2. The suction device of claim 1, wherein the hood is configured for alignment during operation with the prophy head of the dental prophy angle and spaced therefrom to define a suction intake region between the hood and the prophy head along the entire length of an upper circumferential portion of the prophy head and along an upper circumferential portion of an inner portion of the working tip of the prophy head.

3. The suction device of claim 1, wherein the suction tube is configured to be aligned with the prophy neck of the dental prophy angle along a rear of the prophy neck when the working tip is facing forward.

4. The suction device of claim 1, wherein the suction device is removable when coupled to the dental prophy angle.

5. The suction device of claim 1, wherein the suction device and the dental prophy angle are configured during operation to connect to a hand grip, and wherein said suction tube extends downwardly through said hand grip and said hand grip comprises the suction supply in communication with said suction tube.

6. The suction device of claim 1, wherein the suction tube is removably connected to the hood.

7. The suction device of claim 1, wherein the suction tube is non-removably connected to the hood.

8. The suction device of claim 1, wherein the hood comprises a light emitter on an outer end of the hood.

9. A dental tool attachment for controlling the spray of liquid and debris emitted when a dental tool is in use, said dental tool attachment comprising:
   a tubular hood;

said tubular hood having a continuous elongate arced profile extending along a horizontal axis between a front end and a rear end of said tubular hood;

said tubular hood having an arced profile opened at the rear end with said tubular hood operable for installation over the upper portion of a dental prophy head while leaving the lower portion of the prophy head uncovered;

a connector strap;

said connector strap radially extending from one side of said elongate arc profile to the other side around the horizontal axis and operable for said tubular hood and said connector strap to encircle the dental prophy head;

said connector strap having a length that extends along the horizontal axis a distance that is less than the length of said tubular hood from the front end to the rear end;

a suction tube;

an upward end of said suction tube in communication with said rear end of said hood and operable to convey suction between said hood and a dental prophy head;

said suction tube descending in a downward direction following a vertical axis and terminating at a downward end; and, one of vertical neck strips, clips and fasteners encircling said suction tube operable for holding said suction tube against a vertical neck portion of the dental prophy angle.

10. The dental tool attachment of claim 9, wherein said suction tube is removably connected to said hood.

11. The dental tool attachment of claim 9, wherein said suction tube is integrated with said hood.

12. The dental tool attachment of claim 9, wherein said hood comprises a front facing light emitter on an outer end of said hood.

13. The dental tool attachment of claim 9, wherein an inner surface of said continuous elongate arced profile of said hood comprises one or more spacing features extending into said suction region.

14. The dental tool attachment of claim 13, wherein said one or more spacing features define elongated channels extending from said open front end of said hood to said rear end of said hood and open into communication with said suction tube.

* * * * *